United States Patent
Uemura

(10) Patent No.: US 11,196,921 B2
(45) Date of Patent: Dec. 7, 2021

(54) IMAGE CAPTURING APPARATUS, CONTROL METHOD FOR THE SAME, AND STORAGE MEDIUM

(71) Applicant: CANON KABUSHIKI KAISHA, Tokyo (JP)

(72) Inventor: Hidetaka Uemura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/106,474

(22) Filed: Nov. 30, 2020

(65) Prior Publication Data

US 2021/0084220 A1  Mar. 18, 2021

Related U.S. Application Data

(62) Division of application No. 16/453,729, filed on Jun. 26, 2019, now Pat. No. 10,897,571.

(30) Foreign Application Priority Data

Jun. 28, 2018 (JP) .............................. JP2018-123521

(51) Int. Cl.
 *H04N 5/232* (2006.01)
 *G06T 7/00* (2017.01)
 (Continued)

(52) U.S. Cl.
 CPC ......... *H04N 5/23229* (2013.01); *G06T 5/001* (2013.01); *G06T 7/0002* (2013.01);
 (Continued)

(58) Field of Classification Search
 CPC .. H04N 5/23229; H04N 5/2254; H04N 5/911; H04N 5/23216; H04N 5/23209;
 (Continued)

(56) References Cited

U.S. PATENT DOCUMENTS 7,608,866 B2 * 10/2009 Oda .................. H01L 27/14623
 257/232
8,405,887 B2 * 3/2013 Oumi ................. H04N 1/00018
 358/475

(Continued)

FOREIGN PATENT DOCUMENTS

| JP | 06-105241 A | 4/1994 |
|---|---|---|
| JP | 2004-242158 A | 8/2004 |
| JP | 2010-103706 A | 5/2010 |

*Primary Examiner* — Chiawei Chen
(74) *Attorney, Agent, or Firm* — Cowan, Liebowitz & Latman P.C.

(57) ABSTRACT

An image capturing apparatus includes an image sensor, a determination unit configured to determine whether or not a predetermined condition is satisfied, and a control unit configured to acquire foreign substance information from an image obtained by causing the image sensor to perform image capture, wherein if the determination unit determines that the predetermined condition is not satisfied, the control unit acquires the foreign substance information from the image, and if the determination unit determines that the predetermined condition is satisfied, the control unit does not acquire the foreign substance information from the image, and the predetermined condition includes at least one of the following: that a mounted lens unit is a lens unit with a narrow image circle, and that a mode in which only a partial region of the image sensor is recorded has been set.

10 Claims, 12 Drawing Sheets

DEBRIS INFORMATION ACQUIRED WITH NARROW RECORDING REGION

DEBRIS INFORMATION EXTENDED TO WIDE RECORDING REGION

(51) Int. Cl.
    *H04N 5/225*     (2006.01)
    *G06T 5/00*     (2006.01)
    *H04N 5/911*     (2006.01)

(52) U.S. Cl.
    CPC ....... *H04N 5/2254* (2013.01); *H04N 5/23216* (2013.01); *H04N 5/911* (2013.01); *G06T 2207/30168* (2013.01)

(58) Field of Classification Search
    CPC .. H04N 5/23245; H04N 5/772; H04N 9/8042; H04N 5/2171; G06T 7/0002; G06T 5/001; G06T 2207/30168
    See application file for complete search history.

(56) References Cited

U.S. PATENT DOCUMENTS

| | | | | |
|---|---|---|---|---|
| 2003/0193722 | A1* | 10/2003 | Mihara | G02B 15/144113 359/684 |
| 2004/0252991 | A1* | 12/2004 | Kawai | H04N 5/2254 396/529 |
| 2005/0200743 | A1* | 9/2005 | Kawai | G03B 17/14 348/360 |
| 2008/0291436 | A1* | 11/2008 | Aiko | H04N 7/18 356/237.2 |
| 2009/0061554 | A1* | 3/2009 | Suzuki | H04N 5/2253 438/64 |
| 2009/0074285 | A1* | 3/2009 | Fujimori | G06T 5/20 382/141 |
| 2009/0213249 | A1* | 8/2009 | Ikeda | H04N 5/772 348/241 |
| 2010/0146722 | A1* | 6/2010 | Okuno | H04N 5/2171 15/94 |
| 2015/0009296 | A1* | 1/2015 | Crona | H04N 13/239 348/47 |
| 2017/0235095 | A1* | 8/2017 | Sekimoto | G02B 27/646 359/824 |
| 2018/0096474 | A1* | 4/2018 | Guerreiro | G06T 7/0002 |

* cited by examiner

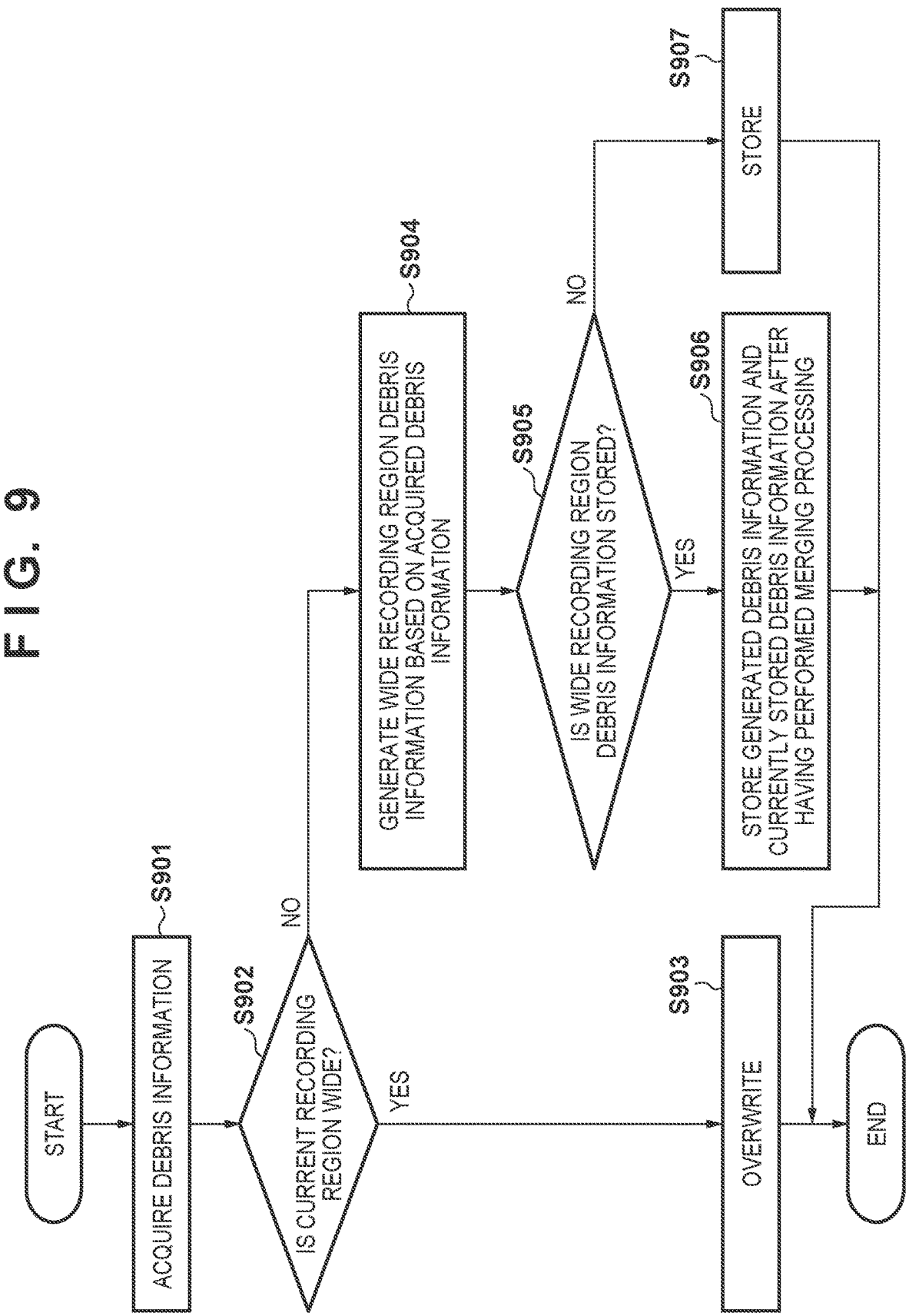

DEBRIS INFORMATION ACQUIRED
WITH NARROW RECORDING REGION

DEBRIS INFORMATION EXTENDED
TO WIDE RECORDING REGION

STORED DEBRIS INFORMATION
WITH WIDE RECORDING REGION

DEBRIS INFORMATION ACQUIRED
AS RESULT OF MERGING

ND STORAGE MEDIUM

CROSS-REFERENCE TO RELATED APPLICATION

This application is a divisional of application Ser. No. 16/453,729, filed Jun. 26, 2019, the entire disclosure of which is hereby incorporated by reference.

BACKGROUND OF THE INVENTION

Field of the Invention

The present invention relates to a technique for suppressing image quality degradation caused by a foreign substance sticking to a surface of an optical low-pass filter, a glass surface of an image sensor, or the like that is arranged in front of the image sensor in an image capturing apparatus.

Description of the Related Art

In a lens-interchangeable digital camera, there is a possibility that dust or the like floating in air will enter the interior of the camera main body when the lens is removed from the camera main body. Also, various types of mechanical portions that operate mechanically, such as a shutter mechanism, are arranged in inside of the camera, and debris such as a metal piece is generated in the camera main body due to these mechanical portions operating. If this kind of foreign substance such as debris or dust sticks to the surface of an optical low-pass filter, the glass surface of the image sensor, or the like arranged in front of the image sensor of the digital camera, the foreign substance will appear as a shadow in the captured image, and the quality of the captured image will decrease.

In order to solve this kind of problem, a method is conceivable in which a pixel in which a foreign substance appears is corrected by, for example, using the signals of the pixels surrounding that pixel. As a technique for correcting such a pixel, for example, Japanese Patent Laid-Open No. H6-105241 has proposed a pixel defect correction method for correcting a pixel defect of an image sensor. Also, Japanese Patent Laid-Open No. 2004-242158 has proposed that, in order to simplify the setting of position information of a pixel defect, an extension of an image file obtained by shooting in a debris information acquisition mode or the like is made different from that of a normal image. By doing so, it is possible to automatically identify a debris information image in a PC (personal computer) and correct a correction target image using the information of the image. Furthermore, Japanese Patent Laid-Open No. 2010-103706 has proposed a method for enabling debris removal processing to be performed also on moving images captured using electronic zoom during moving image recording. In general, debris correction data for debris removal, which is used in this kind of technique, is called dust delete data (DDD).

In recent years, since variation in lenses mounted in an image capturing apparatus has increased, a situation has also occurred in which a lens that does not allow light to hit the entire surface of an image sensor is mounted. In a general image capturing apparatus, an image capturing mode in which only regions hit by light are recording regions is prepared in many cases, envisioning a case in which this kind of lens is mounted. Alternatively, in order to artificially increase zoom magnification, or in order to use only a region with excellent optical characteristics, an image capturing mode in which the surrounding region of an image capturing pixel is removed and only a partial region in the center is used as the recording region is prepared in some cases as well.

However, if acquisition of the dust delete data is executed in this state, a problem arises in that the debris information of all surfaces of the image sensor cannot be acquired. A problem also occurs in that the debris information acquired by mounting a lens that allows light to hit the entire surface of the image sensor cannot simply be used to correct the debris of an image obtained by mounting a lens that does not allow light to hit the entire surface of the image sensor. Alternatively, a problem also occurs in that the debris information acquired from the entire surface of the image sensor cannot simply be used to correct the debris of an image obtained by performing readout of only a partial region of the image sensor.

SUMMARY OF THE INVENTION

The present invention was achieved in view of the foregoing problems, and provides an image capturing apparatus according to which it is possible to acquire suitable debris information and add the debris information to an image.

According to a first aspect of the present invention, there is provided an image capturing apparatus comprising: an image sensor configured to capture a subject image; and at least one processor or circuit configured to function as the following units: a determination unit configured to determine whether or not a predetermined condition is satisfied, and a control unit configured to acquire foreign substance information, which is information on a foreign substance sticking to at least one of the image sensor and an optical element in front of the image sensor, from an image obtained by causing the image sensor to perform image capture, wherein if the determination unit determines that the predetermined condition is not satisfied, the control unit acquires the foreign substance information from the image obtained by causing the image sensor to perform image capture, and if the determination unit determines that the predetermined condition is satisfied, the control unit does not acquire the foreign substance information from the image obtained by causing the image sensor to perform image capture, and the predetermined condition includes at least one of the following: that a mounted lens unit is a lens unit with a narrow image circle with respect to the image sensor, and that a mode in which only a partial region of the image sensor is recorded has been set.

According to a second aspect of the present invention, there is provided an image capturing apparatus comprising: an image sensor configured to capture a subject image; and at least one processor or circuit configured to function as the following units: a control unit configured to acquire foreign substance information, which is information on a foreign substance sticking to at least one of the image sensor and an optical element in front of the image sensor, from an image obtained by causing the image sensor to perform image capture, and a conversion unit configured to convert the foreign substance information, wherein the control unit acquires first foreign substance information from an image corresponding to a first region of the image sensor and acquires second foreign substance information from an image corresponding to a second region that is wider than the first region of the image sensor, and the conversion unit converts one of the first foreign substance information and the second foreign substance information so as to correspond to the other.

According to a third aspect of the present invention, there is provided a method for controlling an image capturing apparatus including an image sensor for capturing a subject image, the method comprising: determining whether or not a predetermined condition is satisfied; and acquiring foreign substance information, which is information on a foreign substance sticking to at least one of the image sensor and an optical element in front of the image sensor, from an image obtained by causing the image sensor to perform image capture, wherein in the acquiring, if it is determined in the determining that the predetermined condition is not satisfied, the foreign substance information is acquired from the image obtained by causing the image sensor to perform image capture, and if it is determined in the determining that the predetermined condition is satisfied, the foreign substance information is not acquired from the image obtained by causing the image sensor to perform image capture, and the predetermined condition includes at least one of the following: that a mounted lens unit is a lens unit with a narrow image circle with respect to the image sensor, and that a mode in which only a partial region of the image sensor is recorded has been set.

According to a fourth aspect of the present invention, there is provided a method for controlling an image capturing apparatus including an image sensor for capturing a subject image, the method comprising: acquiring foreign substance information, which is information on a foreign substance sticking to at least one of the image sensor and an optical element in front of the image sensor, from an image obtained by causing the image sensor to perform image capture; and converting the foreign substance information, wherein in the acquiring, first foreign substance information is acquired from an image corresponding to a first region of the image sensor, and second foreign substance information is acquired from an image corresponding to a second region that is wider than the first region of the image sensor, and in the converting, one of the first foreign substance information and the second foreign substance information is converted so as to correspond to the other.

Further features of the present invention will become apparent from the following description of exemplary embodiments with reference to the attached drawings.

BRIEF DESCRIPTION OF THE DRAWINGS

FIG. 9 is a flowchart showing processing at a time when processing for acquiring debris information is implemented in the second embodiment.

DESCRIPTION OF THE EMBODIMENTS

Hereinafter, embodiments in which the present invention is applied to a lens-interchangeable digital single-lens reflex camera will be described in detail with reference to the accompanying drawings. It should be noted that the present invention is not limited to the following embodiments, and can also be applied to a lens-interchangeable digital video camera, a mobile phone with a camera function, or the like.

First Embodiment

Figure 1:
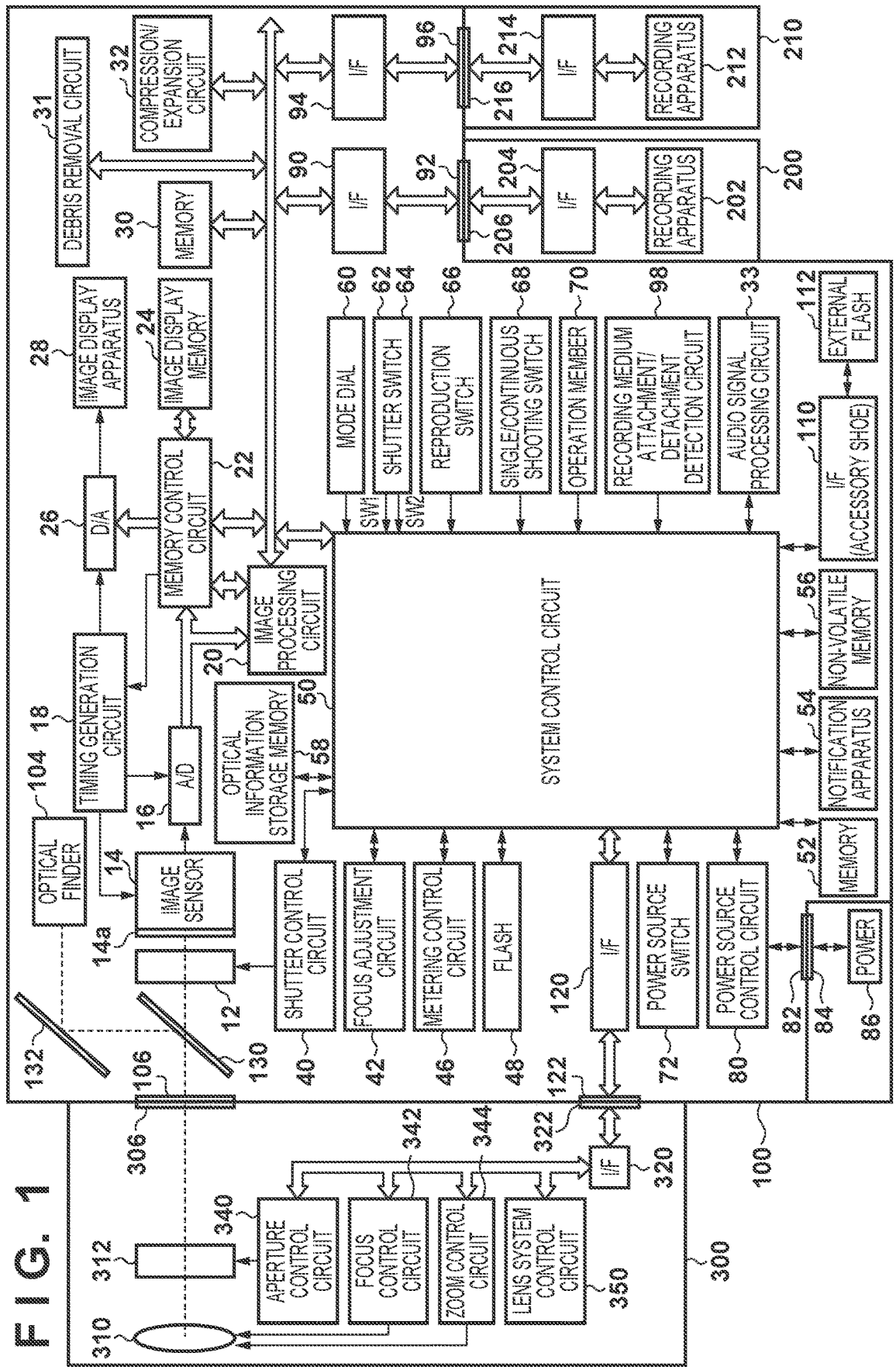
FIG. 1 is a diagram showing a configuration of a digital camera, which is an embodiment of an image capturing apparatus of the present invention.

FIG. 1 is a block diagram showing a configuration of a lens-interchangeable digital single-lens reflex camera serving as an image capturing apparatus according to a first embodiment of the present invention. It should be noted that one or more functional blocks may also be realized using hardware such as an ASIC or a programmable logic array (PLA), and may be realized due to a programmable processor such as a CPU or an MPU executing software. Also, one or more functional blocks may be realized by a combination of software and hardware. Accordingly, in the following description, even if different functional blocks are described as the operating subjects, the subjects can be realized by the same hardware.

The image capturing apparatus of the present embodiment is constituted by mainly including a camera 100 and a lens unit 300 of an interchangeable lens type.

First, the lens unit 300 will be described. The lens unit 300 is mechanically and electrically coupled to the camera 100 due to a lens mount 306 being engaged with a lens mount 106 of the camera 100. The electrical coupling is realized by a connector 122 and a connector 322 provided on the lens mount 106 and the lens mount 306. The lens 310 includes a focus lens for adjusting the focal length of the lens unit 300, and a focus control circuit 342 performs focal adjustment of the lens unit 300 by driving the focus lens along an optical axis. An aperture 312 adjusts the amount and angle of subject light entering the camera 100.

The connector 322 and the interface 320 electrically connect the lens unit 300 to the connector 122 of the camera 100. The connector 322 also has a function of transmitting control signals, state signals, data signals, and the like between the camera 100 and the lens unit 300, and of receiving supply of currents of various voltages. The connector 322 may also have a function of transmitting not only electric communication, but also optical communication, audio communication, and the like.

A zoom control circuit 344 drives a magnification lens of the lenses 310 and adjusts the focal length (angle of view) of the lens unit 300. If the lens unit 300 is a single focal length lens, the zoom control circuit 344 is not present. An aperture control circuit 340 controls the aperture 312 while coordinating with a shutter control circuit 40 for controlling a shutter 12 based on metering information from a metering control circuit 46.

The lens system control circuit 350 has a programmable processor such as a CPU or an MPU, and performs overall control of operations of the lens unit 300 by executing programs stored in advance. Also, the lens system control circuit 350 has a function of a memory for storing constants, variables, programs, and the like for the operations of the lens unit 300. Furthermore, the lens system control circuit 350 also includes a non-volatile memory for storing identification information such as numbers unique to the lens unit, management information, functional information such as an open aperture value, a minimum aperture value, and a focal length, and present and past setting values.

Next, a configuration of a camera 100, which is a digital camera, will be described.

The camera 100 corresponds to a camera system in which multiple types of lens units 300 exist, and lenses of the same type but with different manufacturing numbers can be mounted in the camera 100. Furthermore, the camera 100 has a configuration in which it is possible to also mount a lens unit 300 having a different focal length or open F number, a lens unit 300 having a zoom function, or the like, and to exchange a lens unit 300 with a lens unit of the same type or of a different type.

In the camera 100, an optical flux that has passed through the lens unit 300 passes through the lens mount 106, is reflected by mirrors 130 and 132, and is guided to an optical finder 104. A photographer can perform shooting while using the optical finder 104 to observe a subject as an optical image. Some functions of a later-described notification apparatus 54, such as focus display, camera shake warning display, aperture value display, and exposure correction display are installed in the optical finder 104. It should be noted that the mirror 130 may use a configuration of a quick return mirror or a configuration of a half mirror. A focal plane shutter 12 controls the exposure time of the image sensor 14.

The image sensor 14 is composed of a CCD or CMOS image sensor, has a configuration in which multiple pixels are arranged in two dimensions, performs photoelectric conversion on an optical image of a subject in each pixel, and outputs an electrical signal. The image sensor 14 has not only a non-thinning readout mode in which analog signals are read out from all pixels arranged in the image sensor, but also a thinning readout mode in which the analog signals are output with the pixels thinned out in the horizontal direction and the vertical direction. By utilizing this thinning readout mode, it is possible to obtain analog signals of an optimal number of pixels for a display resolution and a recording resolution.

It should be noted that an optical element 14a such as an optical low-pass filter is arranged in front of the image sensor 14, an a foreign substance such as debris sticking to the surface of the optical element 14a will appear in the image generated by the image sensor 14 and cause degradation of the image quality. The present embodiment is related to a technique for suppressing image quality degradation.

A light beam that has entered the lens 310 is guided via the aperture 312, which is a light amount restricting means, the lens mounts 306 and 106, the mirror 130, and the shutter 12 through a single-lens reflex scheme, and is formed as an optical image on the image sensor 14.

The electrical signal resulting from the photoelectric conversion performed by the image sensor 14 is sent to an A/D converter 16, and the analog signal output is converted into a digital signal (image data). A timing generation circuit 18 supplies a clock signal and a control signal to the image sensor 14, the A/D converter 16, and the D/A converter 26. The timing generation circuit 18 is controlled by a memory control circuit 22 and a system control circuit 50.

The image processing circuit 20 applies predetermined processing such as pixel interpolation processing, white balance processing, and color conversion processing to the image data from the A/D converter 16 or the image data from the memory control circuit 22.

Also, the image processing circuit 20 performs predetermined computational processing using the image data output from the A/D converter 16, as needed. The image processing circuit 20 can perform auto-focus (AF) processing, automatic exposure (AE) processing, and flash pre-emission (EF) processing in a TTL (through-the-lens) scheme, in order for the system control circuit 50 to control the shutter control circuit 40 and the focus adjustment circuit 42 based on the obtained computation result. Furthermore, the image processing circuit 20 also performs predetermined computational processing using the image data output from the A/D converter 16 and performs auto-white balance (AWB) processing in the TTL scheme based on the obtained computation result. Also, the image processing circuit 20 performs image enlarging processing using pixel interpolation processing during electronic zoom.

It should be noted that in the example shown in FIG. 1, the focus adjustment circuit 42 and the metering control circuit 46 are included in a dedicated manner. Accordingly, it is also possible to use a configuration in which AF processing, AE processing, and EF processing are performed using the focus adjustment circuit 42 and the metering control circuit 46, and AF processing, AE processing, and EF processing using the image processing circuit 20 are not performed. Accordingly, it is also possible to use a configuration in which AF processing, AE processing, and EF processing are performed using the focus adjustment circuit 42 and the metering control circuit 46, and furthermore, AF processing, AE processing, and EF processing using the image processing circuit 20 are performed.

The memory control circuit 22 controls the A/D converter 16, the timing generation circuit 18, the image processing circuit 20, the image display memory 24, the D/A converter 26, the memory 30, and the compression/expansion circuit 32. Then, the data of the A/D converter 16 is written in the image display memory 24 or the memory 30 via the image processing circuit 20 and the memory control circuit 22, or the data of the A/D converter 16 is written in the image display memory 24 or the memory 30 directly via the memory control circuit 22. The image data for display, which was written in the image display memory 24, is displayed on the image display apparatus 28, which is constituted by a liquid crystal monitor or the like, via the D/A converter 26. An electronic finder function (live-view display) can be realized by sequentially displaying a moving image captured by the image sensor 14 on the image display apparatus 28. The image display apparatus 28 can turn the display on and off according to an instruction from the system control circuit 50, and the power consumption of the camera 100 can be significantly reduced when the display is turned off.

Also, the memory 30 is used to temporarily store captured still images and moving images, and includes enough storage capacity to store a predetermined number of still images and a moving image of a predetermined amount of time. Accordingly, rapid and high-volume image writing can be performed in the memory 30 also in the case of continuous shooting and panorama shooting. Also, when shooting a moving image, the memory 30 is used as a frame buffer for images to be continuously written at a predetermined frame rate. Furthermore, the memory 30 is used also as a work region of the system control circuit 50.

The debris removal circuit (foreign substance removal circuit) 31 is a circuit for removing debris included in the image data through image processing, using the debris information stored in a later-described non-volatile memory 56, and optical information obtained from the lens unit 300.

The compression/expansion circuit 32 has a function of compressing and expanding image data through an adaptive dispersion cosine transform (ADCT) or the like, reads an image stored in the memory 30, performs compression processing or expansion processing, and re-writes the processed image data in the memory 30. The compression/expansion circuit 32 also has a function of performing compression encoding on the moving image data in a predetermined format or expanding the moving image signal from predetermined compression-encoded data.

The audio signal processing circuit 33 has a function of encoding an audio signal input through a microphone (not shown) in a predetermined encoding format or decoding an audio signal from predetermined encoded data. It should be noted that the digital camera of the present embodiment has a function of outputting audio data decoded by the audio signal processing circuit 33 via a speaker (not shown).

Based on metering information from the metering control circuit 46, the shutter control circuit 40 controls the shutter 12 while coordinating with the aperture control circuit 340 for controlling the aperture 312 of the lens unit 300. The focus adjustment circuit 42 performs AF (auto-focus) processing. The focus state of an image formed as an optical image is measured by allowing a light beam that is incident on the lens 310 in the lens unit 300 to enter in a single-lens reflex scheme via the aperture 312, the lens mounts 306 and 106, the mirror 130, and a focus adjustment sub-mirror (not shown).

The metering control circuit 46 performs automatic exposure control (AE) processing. The luminance of the subject optical image can be measured by allowing the optical flux that has passed through the lens units 300 to enter the metering control circuit 46 via the lens mount 106, the main mirror 130, and the metering lens (not shown). The metering control circuit 46 can determine the exposure condition using a program chart in which the subject luminance and the exposure condition are associated. The metering control circuit 46 also has a light adjustment processing function due to coordinating with the flash 48. Also, the metering control circuit 46 may perform AF control using the measurement result obtained by the focus adjustment circuit 42 and the computational result obtained by computing the image data from the A/D converter 16 using the image processing circuit 20. Furthermore, the metering control circuit 46 may perform exposure control using the measurement result obtained by the metering control circuit 46 and the computational result obtained by computing the image data from the A/D converter 16 using the image processing circuit 20.

The system control circuit 50 has a programmable processor such as a CPU or an MPU, and performs overall control of operations of the camera system by executing programs stored in advance. A non-volatile memory 52 stores constants, variables, programs, and the like for the operations of the system control circuit 50. The notification apparatus 54 is, for example, a liquid crystal display apparatus that displays the operation state, messages, and the like using text, images, audio, and the like, in response to execution of a program in the system control circuit 50. Also, although a display apparatus for performing visual display using an LCD, an LED, or the like, a sound producing element for performing notification using audio, or the like is used in addition as the notification apparatus 54, the notification apparatus 54 is constituted by a combination of one or more of these elements. In particular, in the case of using a display apparatus, the display apparatus is installed at one or more easily-seen locations near an operation member 70 of the camera 100. Also, some functions of the notification apparatus 54 are installed in the optical finder 104 or the image display apparatus 28.

The following display contents of the notification apparatus 54 are examples of display content displayed on an image display apparatus 28 such as an LCD. First, there is display relating to the shooting mode, such as single/continuous shooting display and self-timer display. Also, there is display relating to recording, such as compression rate display, recording pixel count display, recorded image count display, and remaining possible shot count display. Also, there is display relating to shooting conditions, such as shutter speed display, aperture value display, exposure correction display, dimming correction display, external flash emission amount display, and red-eye reduction display. In addition, macro shooting display, buzzer setting display, remaining battery amount display, error display, information display using a number with multiple digits, and display of the attachment or detachment states of the recording medium 200 and the PC 210. Furthermore, display of the attachment or detachment state of the lens unit 300, communication I/F operation display, date/time display, display indicating a state of connection with an external computer, and the like are also performed.

Also, the following display contents of the notification apparatus 54 are displayed in the optical finder 104, for example. The display contents are focus display, shooting preparation completion display, camera shake warning display, flash charging display, flash charging completion display, shutter speed display, aperture value display, exposure correction display, recording medium writing operation display, and the like.

The non-volatile memory 56 is a memory that can be electrically erased and recorded in, and for example, an EEPROM or the like is used thereas. An optical information storage memory 58 stores various types of later-described lens information acquired from the lens units 300 via the connector 122.

Reference numerals 60, 62, 64, 66, 68, and 70 indicate operation means for inputting various types of operation instructions for the system control circuit 50, and are constituted as a combination of one or more of a switch, a dial, a touch panel, pointing using sight line detection, an audio recognition apparatus, and the like.

Here, these operation means will be described in detail. A mode dial 60 can switch between and set functional modes such as power-off, an auto-shooting mode, a program shooting mode, a shutter speed priority shooting mode, an aperture priority shooting mode, a manual shooting mode, a reproduction mode, and a PC connection mode. In addition, it is also possible to switch between and set functional shooting modes such as a portrait shooting mode, a landscape shooting mode, a close-up shooting mode, a sports shooting mode, a night view shooting mode, and a panorama shooting mode.

Reference numeral 62, which indicates a shutter switch SW1, is turned ON when a shutter button (not shown) is half-pressed, and instructs the start of shooting preparation operations, such as AF processing, AE processing, AWB processing, and EF processing. Reference numeral 64, which indicates a shutter switch SW2, is turned ON when the shutter button is fully pressed, and instructs the start of operations of a series of processes relating to shooting. The series of processes relating to shooting is exposure processing, development processing, recording processing, and the like. In exposure processing, the signals read out from the image sensor 14 are written as image data in the memory 30 via the A/D converter 16 and the memory control circuit 22. In the developing processing, developing is performed using computation performed by the image processing circuit 20 and the memory control circuit 22. In the recording processing, the image data is read out from the memory 30, subjected to compression by the compression/expansion circuit 32, and is written as image data in the recording medium 200 or the PC 210.

The reproduction switch 66 instructs the start of a reproduction operation for reading out an image shot in a shooting mode state from the memory 30, the recording medium 200, or the PC 210, and displaying the read-out image on the image display apparatus 28. The reproduction switch 66 can also set functional modes such as a reproduction mode, a multi-screen reproduction/erasing mode, and a PC connection mode.

The single/continuous shooting switch 68 can set a single shooting mode in which one frame is shot and a standby state is entered when the shutter switch (SW2) 64 is pressed, and a continuous shooting mode in which shooting is performed continuously while the shutter switch (SW2) 64 is pressed.

The operation member 70 is an operation means composed of various buttons, a touch panel, and the like. In an example, a live view start/stop button, a moving image recording start/stop button, a zoom switch for switching the magnification of electronic zoom, a menu button, a set button, a multi-screen reproduction page skip button, a flash setting button, a single/continuous shooting self-timer switching button, a menu change+(plus) button, and a menu change−(minus) button are included. Furthermore, a reproduction image move+(plus) button, a reproduction image move−(minus) button, a shooting image quality selection button, an exposure correction button, a dimming correction button, an external flash emission amount setting button, a date/time setting button, and the like are also included. It should be noted that regarding the functions of the above-described plus buttons and minus buttons, numerical values and functions can be selected more nimbly by including a rotation dial switch.

Also, there is an image display ON/OFF switch for setting the ON/OFF state of the image display apparatus 28, and a quick review ON/OFF switch for setting a quick review function for automatically reproducing shot image data immediately after shooting. Also, there is a compression mode switch, which is a switch for selecting a compression rate for JPEG compression, or for selecting a RAW mode in which a signal of an image sensor is digitized as-is and stored in a recording medium. Also, there is an AF mode setting switch according to which it is possible to set a one-shot AF mode and a servo AF mode, and the like. In the one-shot AF mode, an auto-focus operation is started when the shutter switch (SW1) 62 is pressed, and when focus is achieved, the focused state is maintained. In the servo AF mode, the auto-focus operation is continued while the shutter switch (SW1) 62 is pressed. Furthermore, a setting switch according to which a debris information acquisition mode, in which a debris detection image is shot and debris information is acquired, can be set is included.

The power source switch 72 can switch between and set a power-on mode and a power-off mode of the camera 100. Also, settings of the power-on modes and the power-off modes of the various additional apparatuses, such as the lens units 300, the external flash 112, the recording medium 200, and the PC 210 connected to the camera 100 can also be switched between and set accordingly.

The power source control circuit 80 is constituted by a switch circuit or the like for switching a battery detection circuit, a DC/DC converter, and blocks to which a current is to be applied. The power source control circuit 80 performs detection of whether or not a battery is equipped, detection of the type of the battery, and detection of the remaining battery amount, controls the DC/DC converter based on the detection result and instructions from the system control circuit 50, and supplies the needed voltages to the units including recording mediums for a required period. The connectors 82 and 84 connect the power source circuit 86, which is composed of a primary battery such as an alkali battery or a lithium battery, a secondary battery such as a NiCd battery, a NiMH battery, or a lithium ion battery, an AC adapter, or the like, to the camera 100.

Each of the interface 90 and the interface 94 is an interface between a recording medium such as a memory card or a hard disk and a PC, and the connector 92 and the connector 96 are connectors for performing connection between a recording medium such as a memory card or a hard disk and a PC. The recording medium attachment/detachment detection circuit 98 detects whether or not the recording medium 200 or the PC 210 is mounted on the connector 92 or 96.

It should be noted that in the present embodiment, although the interface and the connector for attaching the recording medium have been described as having two systems, the interface and the connector for attaching the recording medium may have one or more systems. It is also possible to use a configuration in which an interface and a connector of different standards are included in combination.

A configuration is possible in which the interface and the connector compliant with the standards of various recording mediums are used. For example, the recording medium is a PCMCIA (Personal Computer Memory Card International Association) card, a CF (compact flash (registered trademark)) card, an SD card, or the like. If the interfaces 90 and 94 and the connectors 92 and 96 are constituted using interfaces and connectors compliant with a standard such as a PCMCIA card or a CF card, various communication cards can be connected. Examples of communication cards include LAN cards, modem cards, USB (Universal Serial Bus) cards, and IEEE (Institute of Electrical and Electronic Engineers) 1394 cards. Other examples include P1284 cards, SCSI (Small Computer System Interface) cards, PHSs, and the like. By connecting these types of communication cards, it is possible to mutually transfer the image data and the management information added to the image data between peripheral devices such as another computer and a printer.

The optical finder 104 can guide a light beam that has entered the lens 310 via the aperture 312, the lens mounts 306 and 106, and the mirrors 130 and 132 according to a single-lens reflex scheme, and can form an image and display it as an optical image. Accordingly, it is possible to perform shooting using only the optical finder, without using an electronic finder function performed by the image display apparatus 28. Also, some functions of the notification apparatus 54, for example, the focused state, the camera shake warning, the flash charging state, the shutter speed, the aperture value, the exposure correction value, and the like are displayed in the optical finder 104.

The external flash 112 is attached via an accessory shoe 110. The interface 120 is used to connect the digital camera 100 to the lens unit 300 in the lens mount 106.

The connector 122 electrically connects the digital camera 100 to the lens unit 300. Also, a lens attachment/detachment detection unit (not shown) detects whether or not the lens unit 300 is mounted on the lens mount 106 and the connector 122. The connector 122 also has a function of transmitting control signals, state signals, data signals, and the like between the camera 100 and the lens unit 300, and of supplying currents of various voltages.

The various types of optical information (aperture, zoom position, pupil position, focal length, etc.) of the lens unit 300, which are communicated via the connector 122, are stored in the optical information storage memory 58 of the digital camera 100. The camera requests communication in some cases, and the lens requests communication whenever information update is performed in some cases. It is also possible to use a configuration in which the connector 122 performs communication through not only electric communication, but also optical communication and audio communication.

The recording medium 200 is composed of a memory card, a hard disk, or the like. The recording medium 200 includes a recording apparatus 202 constituted by a semiconductor memory, a magnetic disk, or the like, an interface 204 with the digital camera 100, and a connector 206 for performing correction with the digital camera 100. A memory card such as PCMCIA card or a compact flash (registered trademark), a hard disk, or the like can be used as the recording medium 200. Naturally, the recording medium may also be constituted by a micro DAT, a magneto-optical disk, an optical disk such as a CD-R or a CD-RW, a phase change optical disk such as a DVD, or the like.

The PC 210 includes: a recording apparatus 212 constituted by a magnetic disk (HD) or the like; an interface 214 with the digital camera 100; and a connector 216 for performing connection to the digital camera 100. A USB, IEEE 1394, or the like is given as the interface 214, but the present invention is not particularly limited thereto.

Next, processing for removing the influence of debris on an optical element 14a such as a low-pass filter or a cover glass arranged in front of the image sensor of the image capturing apparatus having the above-described configuration through image processing will be described.

In the present embodiment, first, a debris detection image (foreign substance detection image) for obtaining debris information (foreign substance information), which is information such as the size of debris (foreign substance) and the position at which the debris is stuck, is shot, the debris data is extracted, and the debris data is generated. Here, it is preferable that the debris detection image is an image obtained by shooting a surface with a luminance that is as uniform as possible, but since it is preferable that the debris detection image can be shot easily at a nearby location, strict uniformity is not required. For example, it is envisioned that a light-blue or white wall surface is shot.

Figure 2:
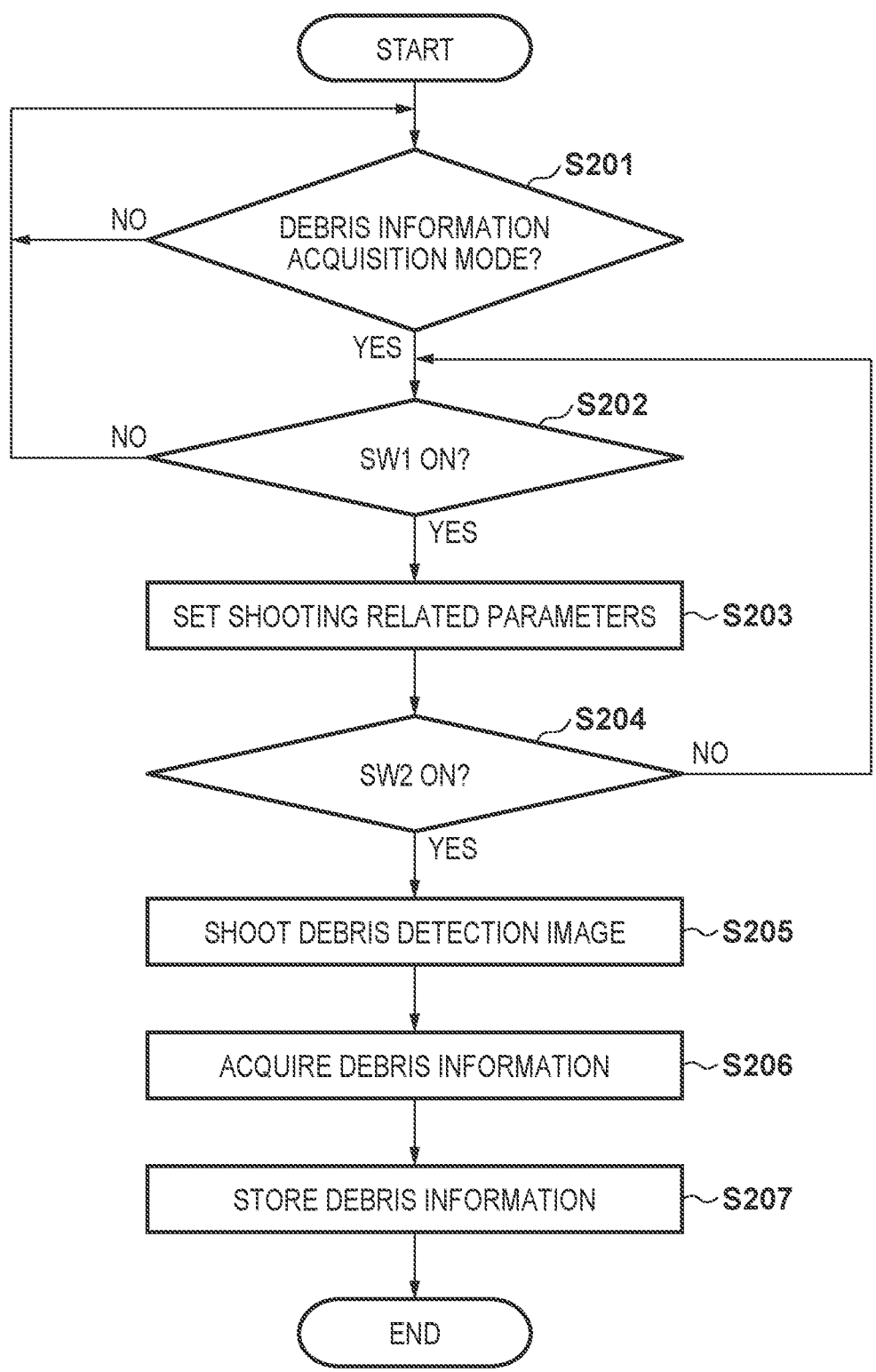
FIG. 2 is a flowchart showing processing for acquiring debris information in a first embodiment.

FIG. 2 is a flowchart showing processing of an image capturing apparatus (in the present embodiment, a digital camera) at a time of acquiring debris information in the present embodiment.

First, in step S201, it is judged whether or not the debris information acquisition mode has been selected using the operation member 70. The judging of step S201 is repeated until the debris information acquisition mode is selected, and when the debris information acquisition mode is selected, the processing advances to step S202, and it is judged whether or not the shutter switch (SW1) 62 has been turned on. If the shutter switch (SW1) 62 is off, the processing returns to step S201, and the above-described processing is repeated.

On the other hand, in step S202, if the shutter switch (SW1) 62 is on, in step S203, the aperture, ISO value, shutter speed, and other parameters relating to shooting are set, and the processing advances to the next step S204.

Here, the aperture is set to a narrow aperture, such as F22. Shooting may also be performed in a state in which the aperture is the narrowest it can possibly be set in the lens unit 300 connected to the lens mount 106. The aperture is narrowed in this manner because the image forming state differs according to the aperture value of the lens unit 300, since debris is normally stuck on an optical element 14a such as the protective glass for protecting the image sensor 14 or an optical filter arranged on the subject side with respect to the image sensor, and not on the surface of the image sensor 14. For this reason, when the aperture is near the open value, the image of the debris blurs, and a suitable image for debris detection cannot be obtained, and therefore it is preferable that shooting is performed with the aperture as narrow as possible.

To return to the description of the flowchart in FIG. 2, before this time, the photographer points the image capturing apparatus at a surface with a luminance that is as uniform as possible, such as a white wall, and operates the shutter switch (SW2) 64.

In step S204, it is judged whether or not the shutter switch (SW2) 64 has been turned ON. If the shutter switch (SW2) 64 is OFF, the processing returns to step S202, and judging of the shutter switch (SW1) 62 is performed. In step S204, if the shutter switch (SW2) 64 is ON, the processing advances to step S205. In step S205, the debris detection image is shot (shooting of a surface with a uniform luminance) and the image data is taken into the memory 30. Next, in step S206, the debris information is obtained from the image data stored in the memory 30 and the processing advances to the next step S207.

Here, the method for acquiring the debris information will be described. Specifically, the position (coordinates) and size of a debris region is obtained from the shot debris detection image. First, the region of the shot debris detection image is divided into multiple blocks, the maximum luminance and the average luminance in each block are calculated, and a threshold value for each block is calculated. Next, since the luminance of a pixel to which the debris sticks is lower than the luminances of the surrounding pixels, a pixel that does not exceed the threshold value is set as a debris pixel, and isolated regions constituted by debris pixels are individually set as debris regions. For each debris region, the maximum value and minimum value of the coordinate in the horizontal direction of the pixel included in the debris region, and the maximum value and minimum value of the coordinate in the vertical direction are obtained, and a radius indicating the size of the debris region is calculated. The positions (coordinates) and radii obtained in this manner are recorded as a debris information profile.

The data size of the debris correction data (debris information profile) is restricted in some cases due to restrictions on the size of the non-volatile memory 56, or the like. In order to handle this kind of case, the debris position information is sorted according to the size and the average luminance value of the debris region. By doing so, it is possible to register the debris correction data with priority given to debris that is noticeable. It should be noted that if there is a debris region that is larger than a predetermined size, the debris region may be excluded from the sorting targets and arranged at the end of a sorted debris region list. This is because in some cases, when interpolation processing is performed later on a large debris region, the image quality decreases, and thus it is preferable to treat a large debris region as the lowest-priority correction target.

Lens information, and information on the position and size of the debris at the time of debris detection image capture are stored in the debris information profile. Furthermore, specifically, the actual aperture value (F value) at the time of debris detection image capture, and the lens pupil position at that time are stored as the lens information at the time of debris detection image capture. Next, the number (integer value) of debris regions is stored in the storage region, and then storage of the parameters of the individual specific debris regions is repeated a number of times equal to the number of debris regions. The parameters of the debris regions are sets of three numerical values, namely the radius of the debris, the x coordinate of the center of the effective image region, and the y coordinate of the center. The acquired debris information is stored in the non-volatile memory 56 in step S207, and the processing for debris information acquisition is ended.

It should be noted that the shooting operation in the debris information acquisition mode is performed in order to acquire the debris information, and therefore in the present embodiment, the compression processing and the processing for storing the shot image in the recording medium 200 are not performed on the shot image itself. This is done to prevent the capacity of the recording medium 200 from being consumed needlessly by image data that is not needed by the user, but it is also possible to store the image in the recording medium 200 after compression, similarly to a normal image, and it is also possible to add some kind of means of changing the file extension or the like at that time.

Here, the present embodiment relates to a method in which image quality degradation caused by debris in the case of shooting mainly a still image is corrected using image processing, and therefore the processing will be described hereinafter.

In the case of a still image, if normal shooting, which is not shooting for a debris detection image, is performed, the debris correction data (debris information profile) is recorded in the recording medium 200 along with the camera setting values at the time of normal shooting and the like, in association with the image data.

Specifically, for example, association can be realized by adding debris correction data to the Exif region, which is the header region of the image file in which the camera setting values at the time of shooting and the like are recorded. Alternatively, association can also be realized by independently recording the debris correction data as a file and recording only the link information of the debris correction data file in the image data. However, if the image file and the debris correction data are recorded separately, the link relationship is eliminated in some cases when the image file is moved, and therefore the debris correction data is preferably stored integrally with the image data.

The debris correction data is stored in association with the image data in this manner because a case is also envisioned in which the image data recorded with this debris correction data attached is moved to an external image processing apparatus and debris removal processing (foreign substance removal processing) is performed by the external image processing apparatus.

Next, debris removal processing at a time of normal shooting, in which the debris information stored in the non-volatile memory 56 as described above is used, will be described with reference to the flowcharts shown in FIGS. 3 and 4. It should be noted that although the description here relates to debris removal processing for a still image, debris removal processing can be performed similarly on a moving image as well by carrying out debris removal processing similar to that for a still image on the image of each frame. Also, this debris removal processing is performed using the debris removal circuit 31 in FIG. 1.

Figure 3:
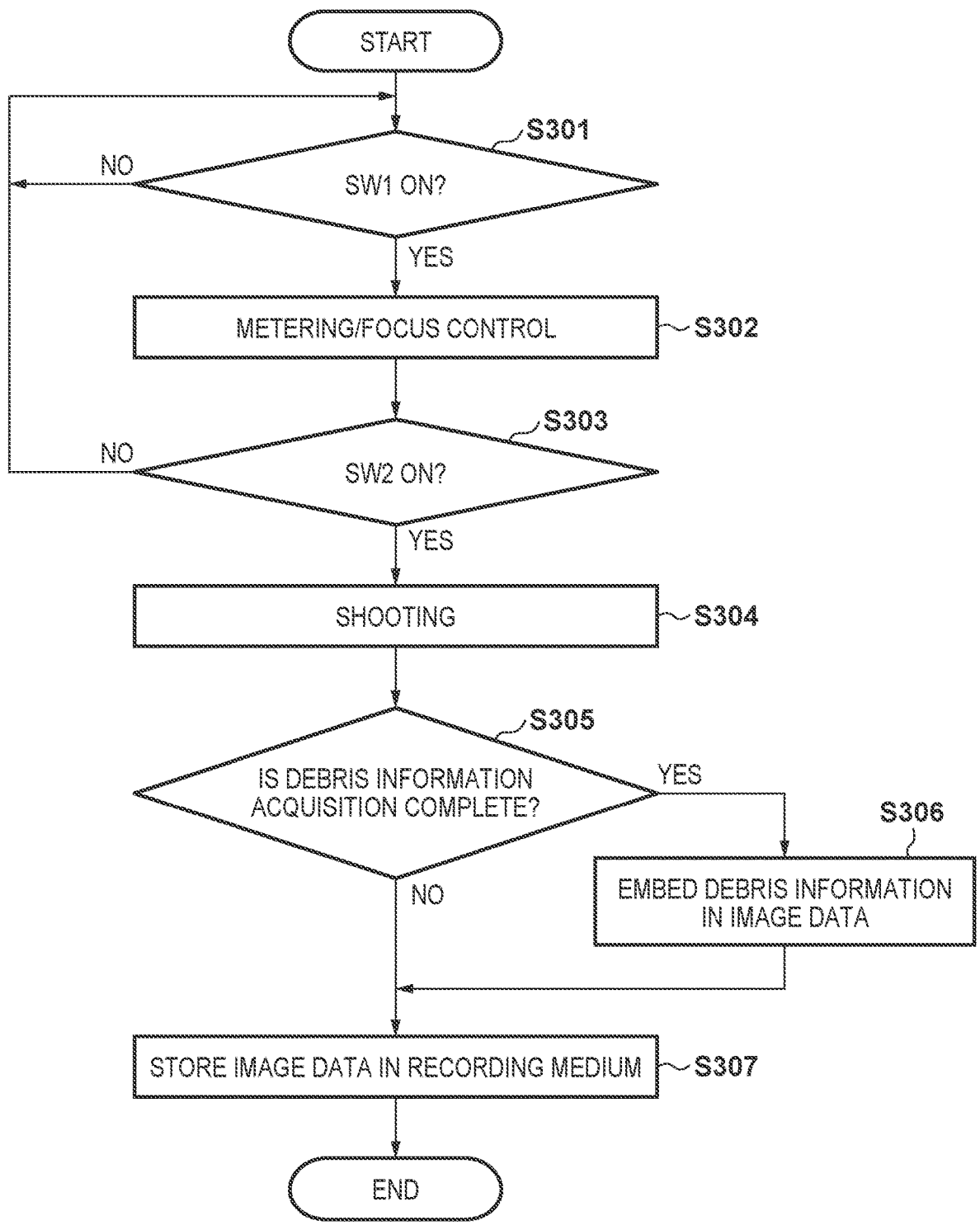
FIG. 3 is a flowchart showing processing for capturing a still image with the camera of the first embodiment.
Figure 4:
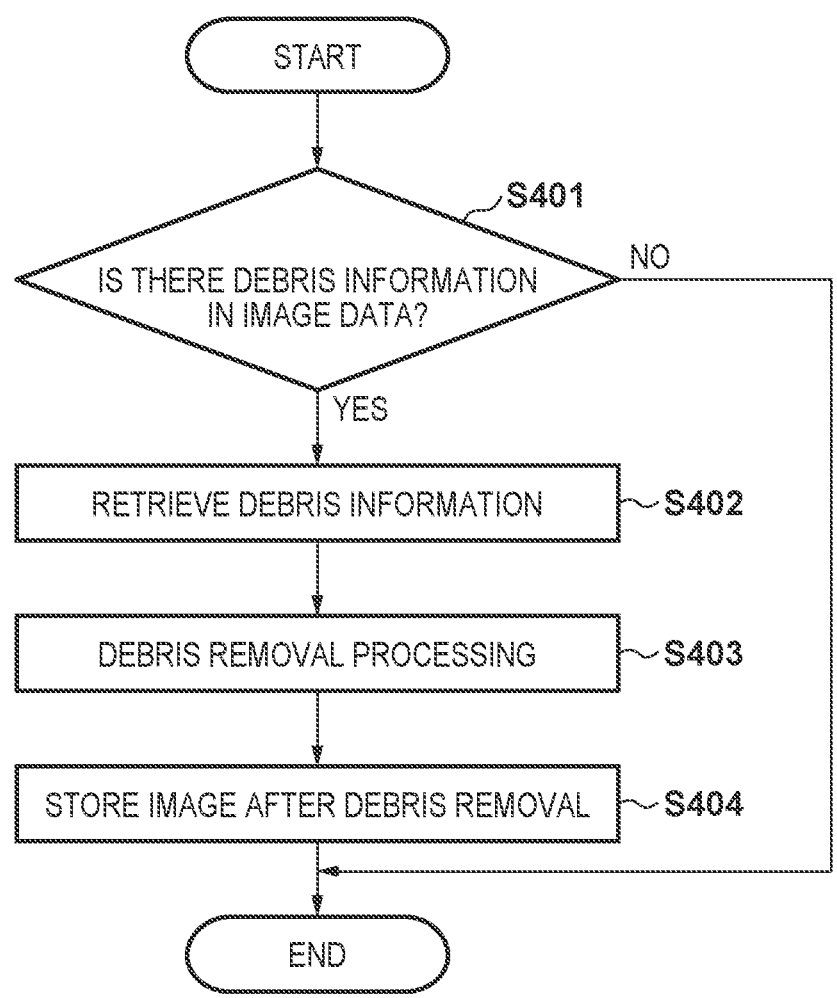
FIG. 4 is a flowchart showing debris removal processing of the first embodiment.

FIG. 3 is a flowchart showing processing for shooting a still image at a time of normal shooting in the present embodiment.

In step S301, standby is performed until the shutter switch (SW1) 62 is turned on. When the shutter switch (SW1) 62 is turned on, the processing advances to step S302, metering and focus adjustment processing are performed, and then in step S303, it is judged whether or not the shutter switch (SW2) 64 has been turned on. If the shutter switch (SW2) 64 is off, the processing returns to step S301 and the above-described processing is repeated, and if it is detected that the shutter switch (SW2) 64 has been turned on, the processing advances to step S304 and shooting is performed. When the shooting ends, the processing advances to step S305, and it is judged whether or not effective debris information is present in the non-volatile memory 56. If there is debris information, the processing advances to step S306, and if not, the processing advances to step S307 and the shot image data is stored in the storage medium 200.

It should be noted that in the present embodiment, although it is judged whether or not there is debris information in the non-volatile memory 56, essentially, it is a necessary condition that shooting in the above-described debris information acquisition mode is performed, and there is no particular limitation on the judging method. For example, it is also possible to use a method in which some kind of flag is set at a time of shooting in the debris information acquisition mode and the flag is evaluated.

In step S306, the acquired debris information is embedded in a header region such as the Exif region in the shot image data (captured image), and the image data in which the debris information has been embedded is stored in the recording medium 200 in step S307.

Next, operations of debris removal processing will be described with reference to FIG. 4. FIG. 4 is a flowchart showing operations of debris removal processing.

In step S401, it is judged whether or not the debris information has been embedded in the selected image. If it has, the processing advances to step S402, and the debris information is retrieved. In step S403, correction processing using pixel interpolation processing or the like on the surrounding pixels of the debris is performed so as to remove the influence of the debris in the image data from the retrieved debris information. The debris removal processing is applied to all debris coordinates, and if the processing has ended for all coordinates, the processing advances to step S404.

In step S404, the image resulting from correction processing, in which the influence of the debris has been removed from the shot image, is newly recorded. If it is judged in step S401 that the debris information has not been embedded, the processing ends without doing anything. With that, the debris removal processing ends.

It should be noted that in the present embodiment, a configuration was shown in which, with the camera 100, the debris information is recorded in the form of being embedded in the shot image data and correction processing for removing the influence of the debris is performed later. In contrast to this, it is also possible to use a configuration in which, when an image is shot and recorded with the camera 100, correction processing for removing the influence of debris is performed without embedding the debris information, and the image resulting from the correction processing is recorded in the recording medium 200. It is also possible to use a configuration in which the debris removal processing is executed by an external apparatus such as a PC.

Next, a case will be described in which a lens unit that has a small image circle and in which a subject image is not formed on the entire surface of the image sensor 14 is used as the lens unit 300. That is, the camera 100 has a so-called full-size image sensor, and a lens for a so-called APS-C size is mounted in the camera. Hereinafter, description will be given using this kind of lens unit as a lens unit with a narrow image circle, and conversely, using a lens unit having an image circle with no deficiency with respect to the image sensor 14 as a lens unit with a wide image circle. In the following operations of the present embodiment, acquisition and addition of the debris information is prohibited when a lens with a narrow image circle is used.

Figure 5:
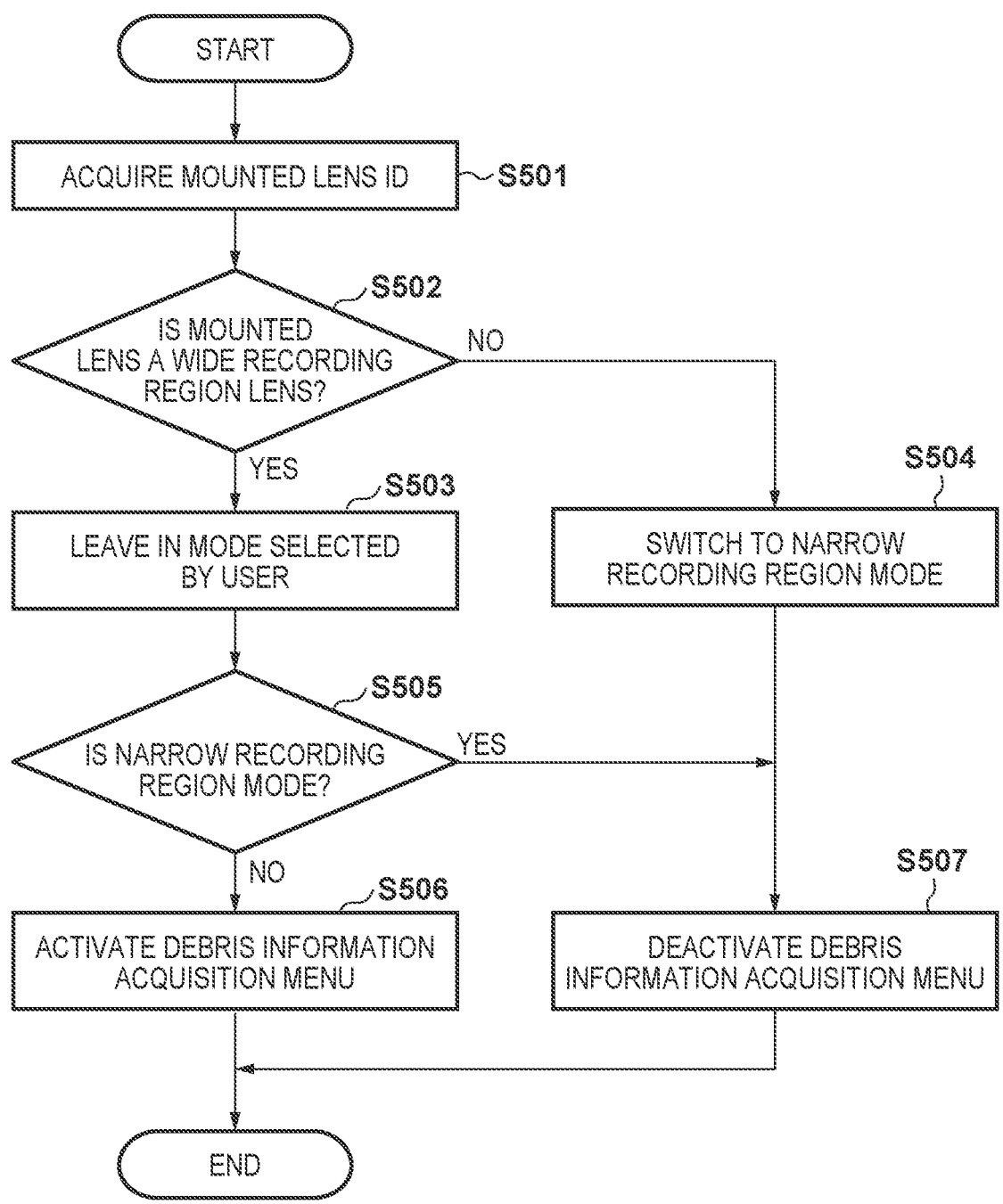
FIG. 5 is a flowchart showing processing for acquiring debris information in the first embodiment.

FIG. 5 shows debris information acquisition menu processing of the present embodiment.

In step S501, the system control circuit 50 acquires the lens ID of the mounted lens via the interface 120, and in the following step S502, it is judged (determined) whether or not the mounted lens unit is a lens unit with a wide image circle. If it is judged that the mounted lens unit is a lens with a wide image circle, the processing advances to step S503, the mode (recording region) currently set by the user is left as-is, and the processing advances to step S505.

In step S502, if it is judged that the mounted lens is a lens with a narrow image circle, the processing advances to step S504, a mode in which the recording region is narrow is switched to, and the processing advances to step S507.

In step S505, it is judged whether or not the mode selected by the user is a mode in which the recording region is narrow. If it is judged that the mode is a mode in which the recording region is wide, in the next step S506, the debris information acquisition menu is activated, and the processing ends. In step S505, if it is judged that the mode is a mode in which the recording region is narrow, the processing advances to step S507.

In step S507, the debris information acquisition menu is deactivated, and the processing ends.

Figure 6:
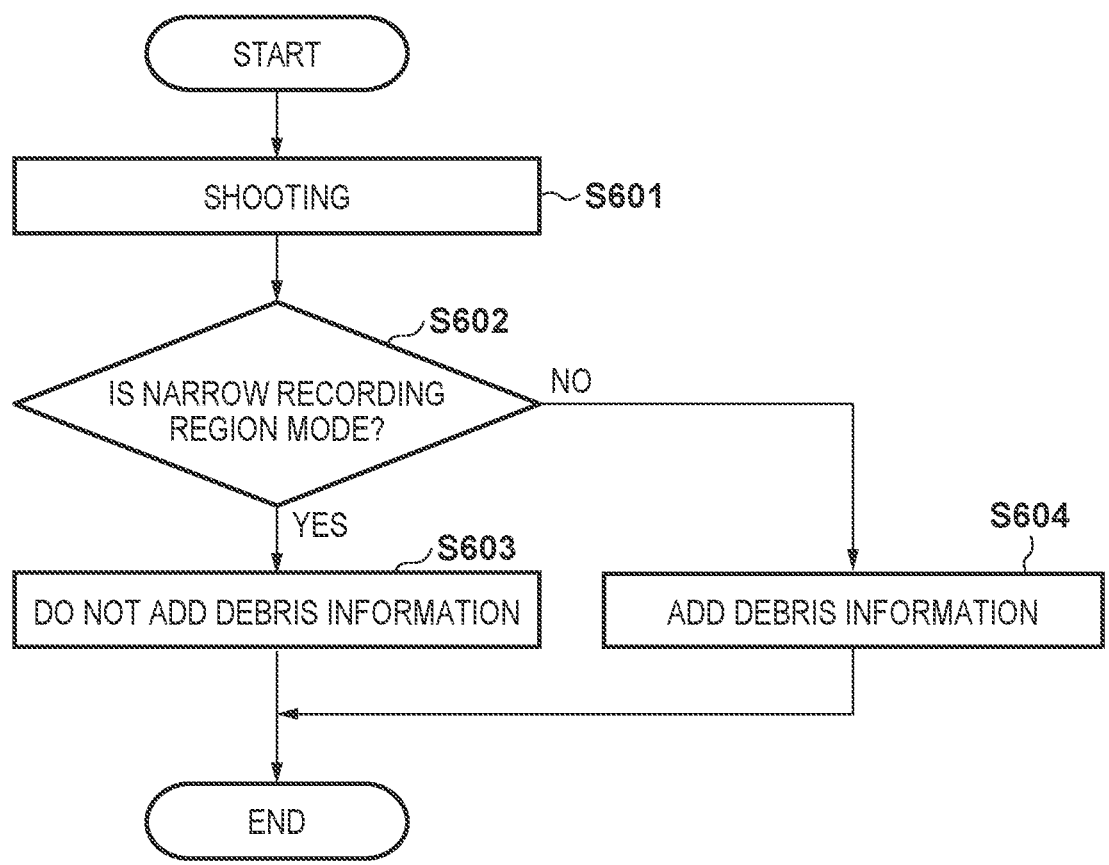
FIG. 6 is a flowchart showing debris information addition processing performed during image capture in the first embodiment.

FIG. 6 is a flowchart showing operations of debris information addition processing at a time of shooting in the present embodiment.

In step S601, the user performs shooting processing. In the next step S602, it is judged whether or not the currently-set mode is a mode in which the recording region is narrow. If it is judged that the current mode is a mode in which the recording region is narrow, in the next step S603, the processing ends without adding the debris information to the shot image. If it is judged in step S602 that the current mode is a mode in which the recording region is wide, in the next step S604, the debris information is added to the shot image and the processing ends.

It should be noted that if it is judged in step S502 of FIG. 5 that the mounted lens is a lens with a narrow image circle, a mode in which the recording region is wide may also be mandatorily switched to, instead of performing the processing of steps S503 and S505. In this case, in step S602 of FIG. 6, instead of judging the currently-set mode, it is also possible to judge whether or not the mounted lens is a lens with a narrow image circle.

Figure 7:
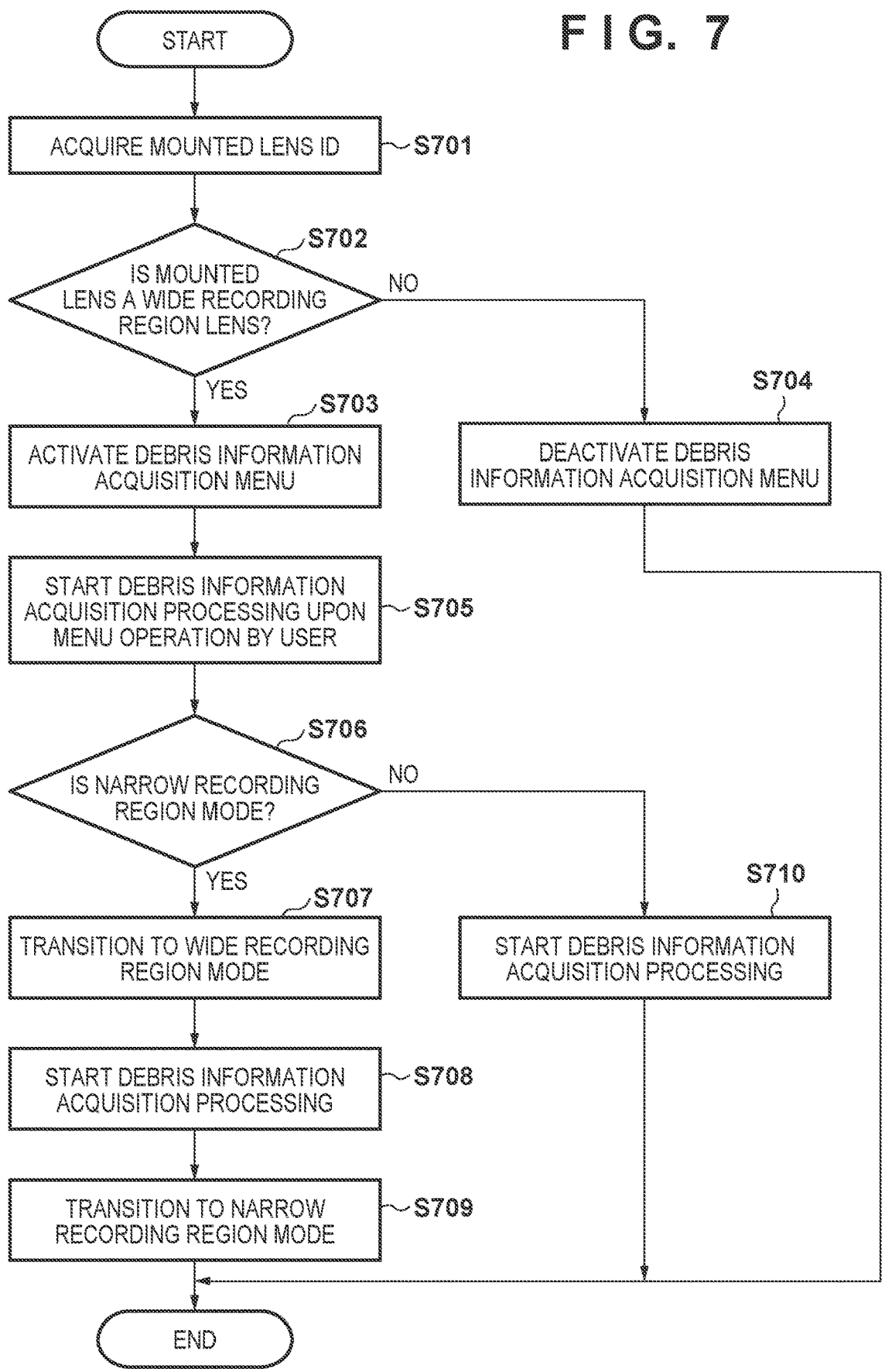
FIG. 7 is a flowchart showing processing for enabling acquisition of debris information when a lens with a wide image circle is mounted in the first embodiment.

In contrast to the example shown in FIG. 5, FIG. 7 is a flowchart showing an example of enabling acquisition of the debris information when a lens with a wide image circle is mounted, even if the mode set by the user is a mode in which the recording region is narrow.

In step S701, the system control circuit 50 acquires the lens ID of the mounted lens via the interface 120.

In step S702, it is judged whether or not the mounted lens is a lens with a wide image circle. If it is judged that the mounted lens is a lens with a wide image circle, the processing advances to step S703, the debris information acquisition menu is activated, and the processing advances to step S705. If it is judged in step S702 that the mounted lens is a lens with a narrow recording region, the processing advances to step S704, the debris information acquisition menu is deactivated, and the processing ends.

In step S705, a user operation on the debris information acquisition menu is awaited. If the user executes debris information acquisition through a menu operation, it is judged in the next step S706 whether or not the currently-set mode is a mode in which the recording region is narrow. If it is judged that the currently-set mode is a mode in which the recording region is narrow, a mode in which the recording region is wide is switched to in step S707, and the processing advances to step S708. If it is judged in step S706 that the currently-set recording mode is a mode in which the recording region is wide, the processing advances to step S710, the debris information acquisition processing is executed, and the processing ends.

In step S708, acquisition of the debris information is carried out, and in the next step S709, the originally-set mode in which the recording region is narrow is switched to, whereafter the processing ends.

As described above, in the present embodiment, acquisition of the debris information is prohibited in the case of a setting in which the recording region is narrow, and addition of the debris information is prohibited for a shot image acquired in that state. Also, even if a mode in which the recording region is narrow is set, if the mounted lens is a lens with a wide image circle, a mode in which the recording region is wide can be switched to, and the debris information can be acquired. Accordingly, it is possible to exclude a case in which the debris information simply cannot be used, and it is possible to prevent an abnormality from occurring in the debris removal processing.

It should be noted that in the present embodiment, description was given premised on the fact that consideration is given to both the width of the image circle of the mounted lens and the width of the set recording region, but there is no limitation to this.

For example, it is also possible to use a configuration in which even if a lens with a narrow image circle is mounted, the entire effective region of the image sensor 14 is set as the recording region without switching to a mode in which the recording region is narrow. In the case of this kind of configuration, a problem arises in that the debris information cannot be detected in a region located outside of the image circle. For this reason, if a lens with a small image circle is mounted, it is sufficient that the debris information acquisition menu is deactivated, or the debris information is not added to the shot image.

Also, in the case of using a configuration in which a mode in which the recording region is narrow can be set regardless of the type of the mounted lens, a problem arises in which the debris information cannot be detected in a region located outside of the storage region. For this reason, if a mode in which the recording region is narrow is set, it is sufficient that the debris information acquisition menu is deactivated or the debris information is not added to the shot image, regardless of the type of the mounted lens.

Second Embodiment

In the second embodiment, an example will be described in which, even if the recording region is narrow, acquisition of the debris information is allowed and it is possible to perform conversion to debris information that corresponds to a different recording region.

Figure 8A:
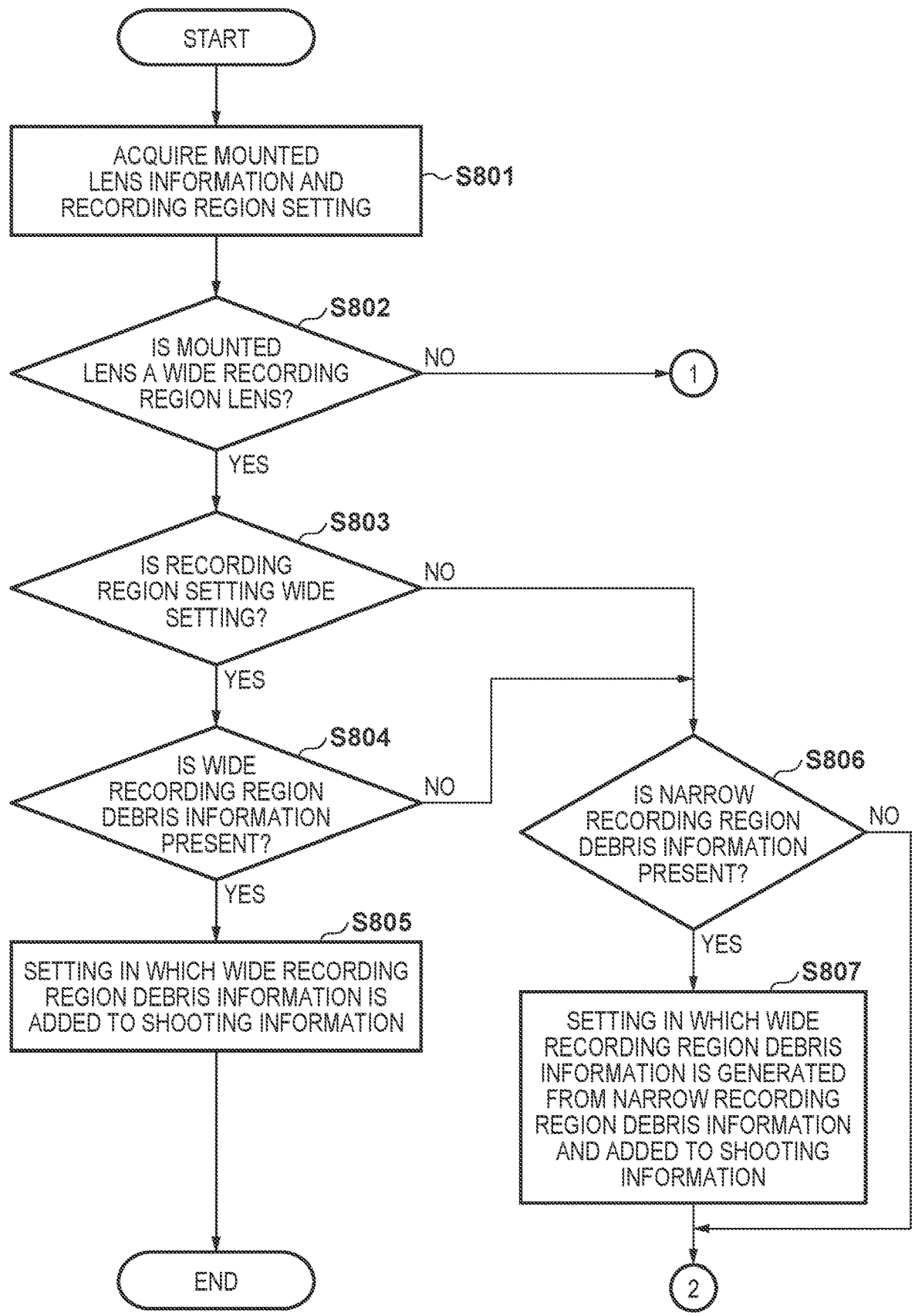
FIGS. 8A and 8B are flowcharts showing processing for enabling mutual use of debris information in different recording regions in a second embodiment.
Figure 8B:
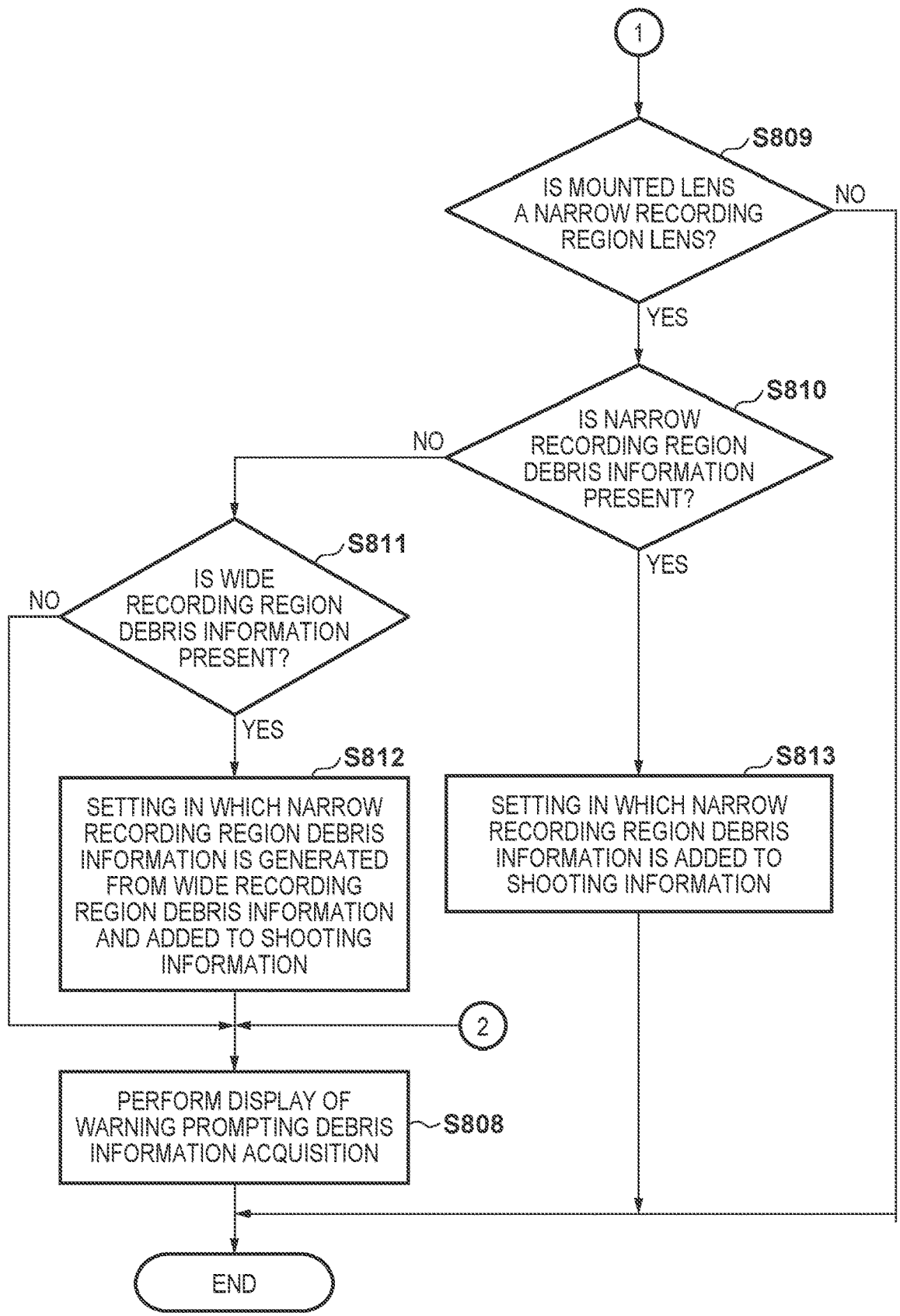

FIGS. 8A and 8B are flowcharts showing operations of mutual usage processing for debris information in the present embodiment.

In step S801, the mounted lens information and the set recording region information are acquired, and in the following step S802, it is judged whether or not the mounted lens unit is a lens unit with a wide image circle. If it is judged that the mounted lens unit is a lens unit with a wide image circle, the processing advances to step S803. In step S803, it is judged whether or not the set recording region is a wide region setting. If it is judged that the set recording region is a wide region setting (if the width of the region matches), the processing advances to step S804, and it is judged whether or not there is debris information with a wide recording region, that is, whether or not the debris information has been stored in the non-volatile memory 56. If it is judged that there is debris information with a wide recording region, in the next step S805, a setting for adding debris information with a wide recording region to the shooting information is set, and the processing ends.

If it is judged in step S803 that the set recording region is a narrow region setting, or if it is judged in step S804 that there is no debris information with a wide recording region, the processing advances to step S806. In step S806, it is judged whether or not there is debris information with a narrow recording region. If it is judged that there is debris information with a narrow recording region, in the next step S807, a setting is used in which, based on debris information with a narrow recording region (one piece of debris information), debris information with a wide recording region (another piece of debris information) is generated, and the debris information is added to the shooting information. Thereafter, in the next step S808, warning display for prompting debris information acquisition is performed, and the processing ends. The method for generating the debris information will be described later with reference to FIG. 10.

If it is judged in step S806 that there is also no debris information with a narrow recording region, in step S808, warning display for prompting debris information acquisition is performed, and the processing ends.

If it is judged in step S802 that the mounted lens unit is not a lens unit with a wide image circle, in the next step S809, it is judged whether or not the mounted lens unit is a lens unit with a narrow recording region. If it is judged that the mounted lens unit is a lens unit with a narrow recording region, in the next step S810, it is judged whether or not there is debris information with a narrow recording region. If it is judged that there is debris information with a narrow recording region, in the next step S813, a setting for adding debris information with a narrow recording region to the shooting information is set, and the processing ends.

If it is judged in step S810 that there is no debris information with a narrow recording region, in the next step S811, it is judged whether or not there is debris information with a wide recording region. If it is judged that there is debris information with a wide recording region, in the next step S812, a setting is used in which, based on debris information with a wide recording region (one piece of debris information), debris information with a narrow recording region (another piece of debris information) is generated, and the debris information is added to the shooting information. Thereafter, in the next step S808, warning display for prompting debris information acquisition is performed, and the processing ends.

If it is judged in step S811 that there is also no debris information with a wide recording region, in step S808, warning display for prompting debris information acquisition is performed, and the processing ends.

If it is judged in step S809 that the mounted lens is not a lens with a narrow recording region, that is, the mounted lens is a lens that cannot be judged, the processing ends without doing anything.

As described above, in the present embodiment, by making it possible to mutually convert and generate debris information with a wide recording region and debris information with a narrow recording region, acquisition of the debris information is always allowed instead of being prohibited according to the condition, and if re-acquisition is preferable, warning display is performed. Accordingly, it is possible to prevent debris information unwanted by the user from being added to the image data. It should be noted that in the present embodiment, an example was given in which a warning is always displayed if there is no debris information corresponding to the mounted lens unit, but a warning may also be displayed only if there is no debris information that can be converted, and it is also possible not to perform warning display.

Here, in the present embodiment, the timing of debris information conversion processing was not mentioned, but an example is conceivable in which other debris information is also generated when acquisition of the debris information is performed. Hereinafter, a method therefor will be described.

FIG. 9 is a flowchart showing processing performed when acquisition of the debris information is carried out in the present embodiment. Here, in the present embodiment, description will be given assuming that only one pattern of debris information can be stored in the non-volatile memory 56. In this case, it is assumed that the debris information to be stored is debris information with the widest storage region.

In step S901, the debris information is acquired according to a user operation on the debris information acquisition menu. In the next step S902, it is judged whether or not the current recording region is wide due to a factor such as the mounted lens or the menu setting. If it is judged that the current setting is a state in which the recording region is wide, in the next step S903, the debris information acquired in step S901 is stored by overwriting the currently-stored debris information.

If it is judged in step S902 that the current setting is a state in which the recording region is narrow, in the next step S904, debris information with a wide recording region is generated based on the debris information acquired in step S901. In the next step S905, it is judged whether or not the debris information with the wide recording region has already been recorded. If it is judged that the debris information with the wide recording region has already been stored, in the next step S906, the debris information generated in step S904 and the debris generation that has already been stored are merged (composited) to generate new debris information, and the new debris information is stored.

If it is judged in step S905 that the debris information with a wide recording region has not yet been stored, in the next step S907, the debris information generated in step S904 is stored.

FIGS. 10A to 10D are schematic diagrams showing processing for generating debris information with a wide recording region from debris information acquired in a state in which the recording region is narrow, and for merging the generated debris information with a wide recording region with the already-stored debris information with a wide recording region, as described in FIGS. 8 and 9.

Figure 10A:
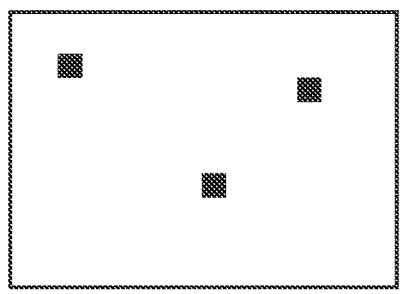
FIGS. 10A to 10D are diagrams for illustrating processing for merging debris information in the second embodiment.

FIG. 10A shows debris information obtained as a result of executing acquisition of the debris information in a state in which the recording region is narrow. This shows the state of step S901 in the case where a lens with a narrow recording region is mounted in FIG. 9.

Figure 10B:
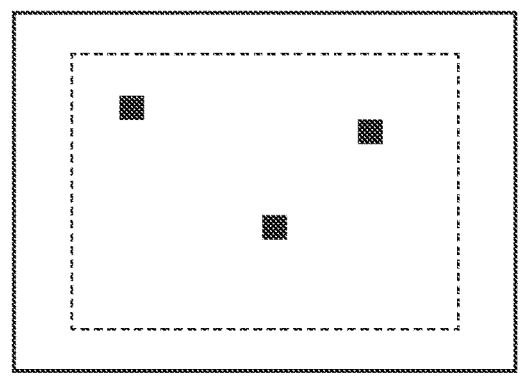

FIG. 10B shows a state in which the debris information of FIG. 10A has been converted into debris information with a wide recording region. This corresponds to the state of step S904 of FIG. 9. The same also applies to the conversion carried out in step S807 of FIG. 8A.

Figure 10C:
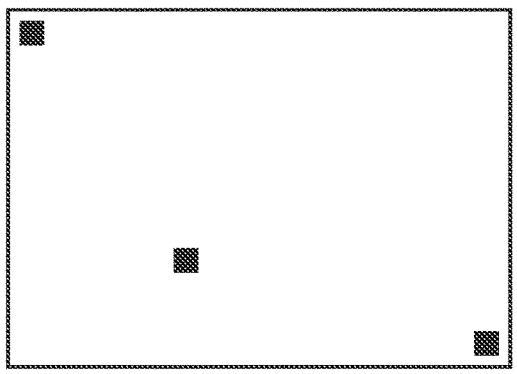

FIG. 10C shows the already-stored debris information with a wide recording region. If it has been stored, the result of the judging performed in step S811 of FIG. 8B and step S905 of FIG. 9 is YES.

Figure 10D:
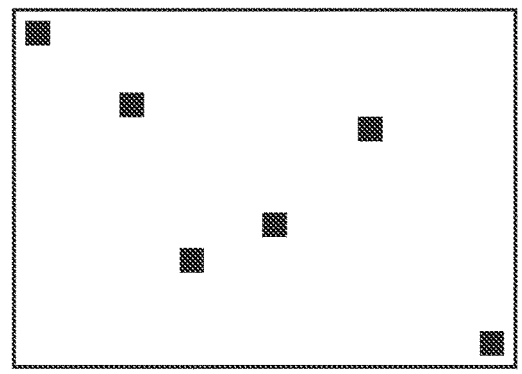

FIG. 10D shows debris information obtained as a result of merging FIG. 10B, which is debris information generated based on the debris information with a narrow recording region, and FIG. 10C, which is the already-stored debris information with a wide recording region. The debris information generated in step S807 of FIG. 8A and step S906 of FIG. 9 corresponds thereto.

Figure 11:
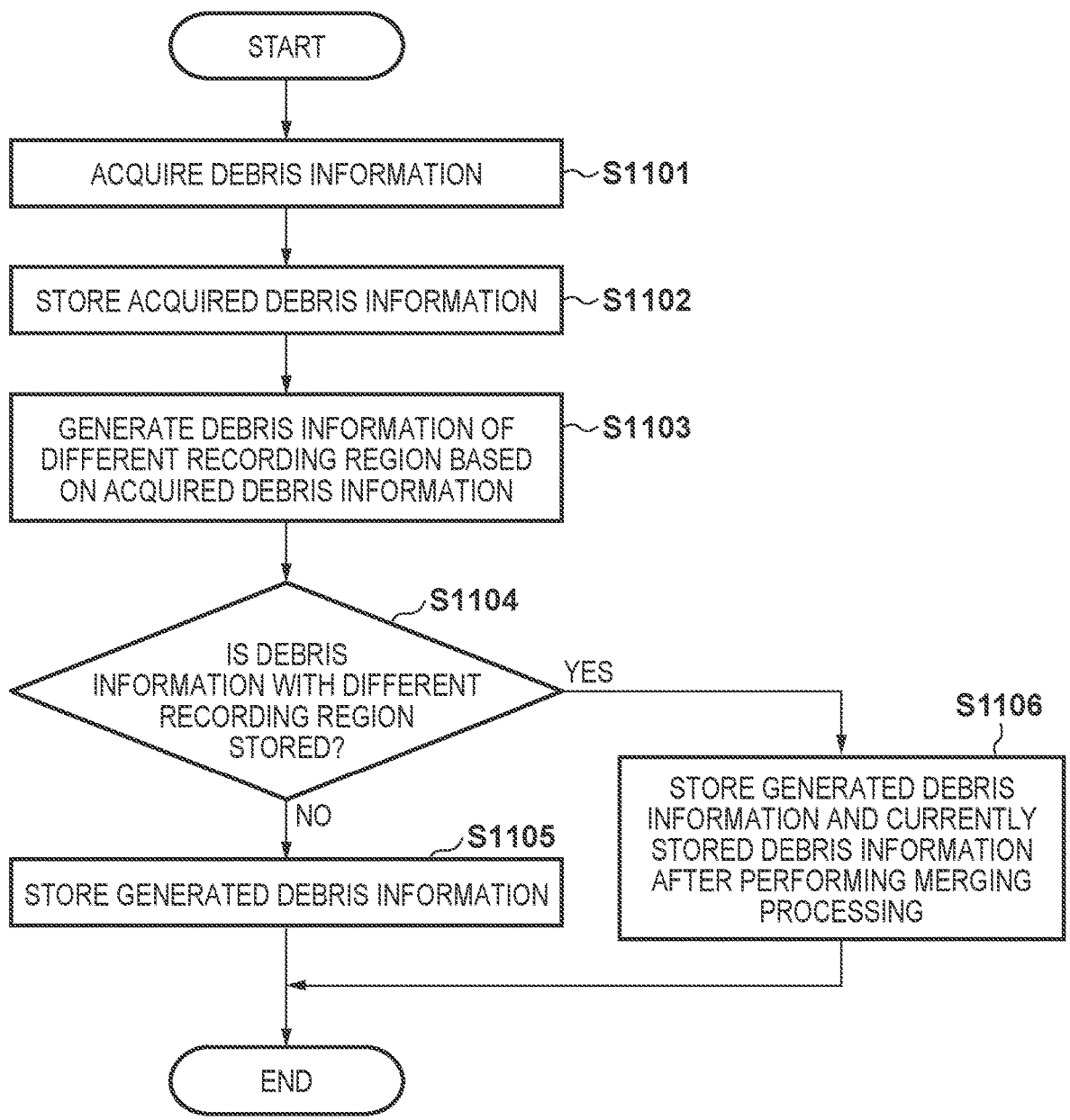
FIG. 11 is a flowchart showing processing at a time when processing for acquiring debris information is implemented in the second embodiment.

FIG. 11 is a flowchart showing processing performed at a time of executing acquisition of debris information in the second embodiment. Here, description will be given assuming that multiple pieces of debris information can be stored in the non-volatile memory 56. That is, description will be given assuming that two pieces of debris information, namely debris information with a wide recording region and debris information with a narrow recording region, can be stored.

In step S1101, the debris information is acquired through a user operation on the debris information acquisition menu. In the next step S1102, the currently-acquired debris information is stored in a predetermined region. In step S1103, generation of debris information with a different recording region is performed based on the currently-acquired debris information, and in the next step S1104, it is judged whether or not debris information with a different recording region has already been stored. If it is judged that debris information with a different recording region has not yet been stored, in the next step S1105, the debris information generated in step S1103 is stored in a predetermined region.

If it is judged in step S1104 that debris information with a different recording region has already been stored, in the next step S1106, the debris information generated in step S1103 and the already-stored debris information are merged to generate new debris information, and the new debris information is stored. Here, in the present embodiment, merging was performed, but overwriting may also be performed.

As described above, in the present embodiment, an example of debris information conversion processing in both a case where only debris information of one pattern can be stored due to restrictions on the storage region, and a case where multiple patterns can be stored. Accordingly, acquisition of debris information is always allowed and is not prohibited depending on the condition, and thus it is possible to prevent debris information unwanted by the user from being added to the image data.

The present invention was described in detail above based on suitable embodiments, but the present invention is not limited to these specific embodiments, and the present invention also encompasses various modes that do not depart from the gist of the invention. Some of the above-described embodiments may also be combined as needed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-123521, filed Jun. 28, 2018 which is hereby incorporated by reference herein in its entirety.

What is claimed is:

1. An image capturing apparatus comprising:
   an image sensor configured to capture a subject image; and at least one processor or circuit configured to function as the following units:

a control unit configured to acquire foreign substance information, which is information on a foreign substance sticking to at least one of the image sensor and an optical element in front of the image sensor, from an image obtained by causing the image sensor to perform image capture, and a conversion unit configured to convert the foreign substance information, wherein the control unit acquires first foreign substance information from an image corresponding to a first region of the image sensor and acquires second foreign substance information from an image corresponding to a second region that is wider than the first region of the image sensor, and the conversion unit converts one of the first foreign substance information and the second foreign substance information so as to correspond to the other.

2. The image capturing apparatus according to claim 1, wherein the at least one processor or circuit is configured to further function as an addition unit configured to add the foreign substance information to the image obtained by causing the image sensor to perform image capture.

3. The image capturing apparatus according to claim 2, wherein if an image corresponding to the first region has been obtained from the image sensor, the addition unit adds, to the image, the first foreign substance information or foreign substance information obtained by converting the second foreign substance information so as to correspond to the first foreign substance information.

4. The image capturing apparatus according to claim 2, wherein if an image corresponding to the second region has been obtained from the image sensor, the addition unit adds, to the image, the second foreign substance information or foreign substance information obtained by converting the first foreign substance information so as to correspond to the second foreign substance information.

5. The image capturing apparatus according to claim 1, wherein the at least one processor or circuit is configured to further function as a compositing unit configured to further composite foreign substance information obtained by converting the second foreign substance information so as to correspond to the first foreign substance information, with the first foreign substance information.

6. The image capturing apparatus according to claim 1, wherein the control unit selects whether to cause the image sensor to generate an image corresponding to the first region or to cause the image sensor to generate an image corresponding to the second region, according to a width of an image circle of a lens unit mounted in the image capturing apparatus.

7. The image capturing apparatus according to claim 1, wherein the control unit selects whether to cause the image sensor to generate an image corresponding to the first region or to cause the image sensor to generate an image corresponding to the second region, according to a user setting.

8. The image capturing apparatus according to claim 7, wherein if a predetermined condition is satisfied, the control unit acquires foreign substance information, which is information on a foreign substance sticking to at least one of the image sensor and an optical element in front of the image sensor, from an image obtained by causing the image sensor to perform image capture, and the predetermined condition is that a region selected according to a user setting among the first region and the second region and a width of an image circle of a mounted lens unit correspond to each other.

9. A method for controlling an image capturing apparatus including an image sensor for capturing a subject image, the method comprising:

acquiring foreign substance information, which is information on a foreign substance sticking to at least one of the image sensor and an optical element in front of the image sensor, from an image obtained by causing the image sensor to perform image capture; and converting the foreign substance information, wherein in the acquiring, first foreign substance information is acquired from an image corresponding to a first region of the image sensor, and second foreign substance information is acquired from an image corresponding to a second region that is wider than the first region of the image sensor, and in the converting, one of the first foreign substance information and the second foreign substance information is converted so as to correspond to the other.

10. A non-transitory computer-readable storage medium storing a program for causing a computer to execute steps of a control method for an image capturing apparatus including an image sensor for capturing a subject image, the method comprising:

acquiring foreign substance information, which is information on a foreign substance sticking to at least one of the image sensor and an optical element in front of the image sensor, from an image obtained by causing the image sensor to perform image capture; and converting the foreign substance information, wherein in the acquiring, first foreign substance information is acquired from an image corresponding to a first region of the image sensor, and second foreign substance information is acquired from an image corresponding to a second region that is wider than the first region of the image sensor, and in the converting, one of the first foreign substance information and the second foreign substance information is converted so as to correspond to the other.

* * * * *